Dec. 26, 1961   J. L. BOWER   3,015,088
AUTOMATIC INTERLOCK SYSTEM
Filed Nov. 25, 1957
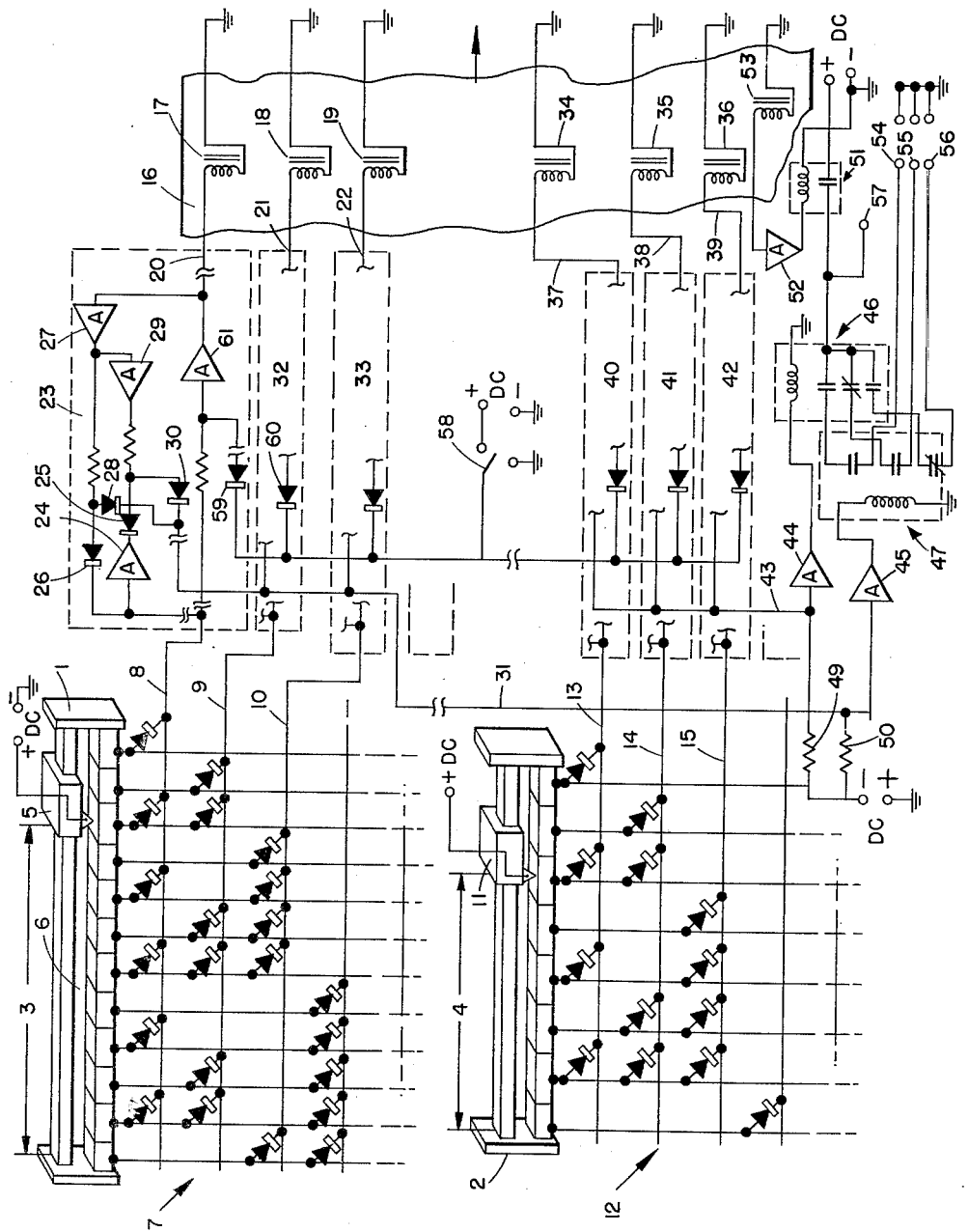
INVENTOR.
JOHN L. BOWER
BY *Lewis L. Humphries*
ATTORNEY

3,015,088
AUTOMATIC INTERLOCK SYSTEM
John L. Bower, Downey, Calif., assignor to North American Aviation, Inc.
Filed Nov. 25, 1957, Ser. No. 698,784
7 Claims. (Cl. 340—149)

This invention relates to an automatic interlock system and more particularly to a device capable of checking the values of a given number of conditions.

In many devices, such as a machine tool, a computer, or an electronic master control system, the existence of certain values of a number of conditions, or qualities, must be determined before commencing operation. For example, on a milling machine, one of several profile bars must be selected for each position of the cutter. Any other combination gives a false or incorrect cut. It is desirable, therefore, that a quick, or even continuous, check be obtainable of the correct set-ups.

Not only does the device of the invention check the correctness of the value of a certain condition, but it also checks a plurality of conditions. The method of quickly checking the existence of given values of several conditions requires a previous determination of the suitable combinations. A practical scheme must, therefore, readily record the suitable combinations for later reference. The device must be flexible and must provide a simple system which is readily adaptable to examining a greater number or a lesser number of values of each condition and to examining a greater or lesser number of conditions. Visual or electrical indication can be provided to determine correctness of the values of each condition examined.

Greater accuracy and flexibility is gained by encoding the values of the various conditions. The encoded signals are digital in form and readily distinguishable from other values. After encoding, the signals are compared with previously recorded or stored values which are known to be correct. Values of several conditions may be encoded and thereafter compared simultaneously with previously stored information.

It is therefore an object of this invention to provide an automatic interlock system.

It is still another object of this invention to provide a device indicating the correctness and incorrectness of values of given conditions within a system.

It is still another object of this invention to provide a device for encoding values of a plurality of conditions within a system and comparing the encoded signals with previously stored signals.

Still another object of this invention is to provide a device capable of checking a plurality of conditions within a system and indicating correspondence with previously stored information.

A further object of this invention is to provide simultaneous checking of a plurality of conditions.

Referring to the single figure which is a schematic diagram of the device, measuring devices 1 and 2 are illustrated as providing the indication of the conditions to be examined. The lengths 3 and 4 represent the conditions. It may be understood that characteristics other than length may be examined and that this figure is only an example. Other characteristics, or qualities, which may be examined are weight, temperature, shape, position and so forth. It is only necessary to provide a representation for each of the conditions to be examined and electrical means indicating the representation. The position of slider 5 on measuring device 1 provides an indication of a representation of length, for example, by means of, for example, a segmented scale 6. Each segment of scale 6 is connected to a respective input line in the diode matrix 7. Scale 6 need not necessarily be segmented but may be successive mechanical or electrical switch connections or other apparatus of variable position. The diode matrix operates as a binary digital encoder of the position of slider 5 and encodes the value represented in this instance as length 3. The encoded output signal of the position of slider 5 is received simultaneously (in time parallel) on output lines 8, 9, 10, etc. Electrical signals encoding the value represented in this instance as length 4, indicated by the position of slider 11 are likewise produced by diode matrix 12 and are provided on output lines 13, 14, 15, etc., simultaneously (in time parallel).

A magnetic member, such as tape 16, passes under reading heads 17, 18 and 19 which read out the stored information which is transmitted on lines 20, 21 and 22, to be compared with the information on lines 8, 9 and 10. Coincidence means 23, shown within dotted lines, determines whether the output on line 8 agrees with the output on line 20. If line 8 is at a high potential, inverting binary amplifier 24 ("binary" indicating having two output states, such as, for example, the two output states of an easily-saturable amplifier) provides a low potential output and the cathode of diode 25 is at a low potential and the diode is in the conducting state. Diode 26 is at the same time non-conducting. If line 20 is also at a high potential, as is line 8, inverting reading amplifier 27 provides a low potential to the diode 28 which places it in non-conduction. The low output of inverting reading amplifier 27 is received by inverting binary amplifier 29 which may also obtain its binary function by being an easily-saturable amplifier. The signal is then passed as a high potential by amplifier 29 but diode 30 is held to non-conduction by the low output of amplifier 24 fed through diode 25 which shunts the output of amplifier 29. A low potential thus exists on line 31 and agreement between line 8 and the recorded information received through line 20 is indicated. Amplifier 61 is not utilized until recording is desired and switch 58 is thrown to positive D.-C. to render diode 59 non-conducting as explained hereafter. The inverting binary amplifier may, for example, comprise a transistor switch which is driven into saturation by a predetermined input signal and returned to cutoff by an appropriately applied bias voltage upon the termination of the input signal. A typical such circuit is illustrated and explained on pages 316 and 317 of Transistor Circuit Engineering, by Richard F. Shea.

If line 8 is at a low potential, inverting binary amplifier 24, which is similar to inverting binary amplifier 29, provides a high potential on the cathode of diode 25 which is then non-conducting. Diode 26, however, is conducting, and diode 28 is thus non-conducting. If line 20 is likewise at a low potential, in agreement with line 8, the output of inverting reading amplifier 27 is high and binary amplifier 29 provides a low potential to diode 30. Again, lack of high potential on line 31 indicates agreement between lines 8 and 20. If lines 8 and 20 do not agree, a high potential is received on line 31. Thus, coincidence means 23 determines whether or not the output voltage level on line 8 is the same as that on line 20 and provides a low potential signal indicating agreement or a high potential signal representing disagreement. At the same time, coincidence means 32 indicates the coincidence between lines 9 and 21, and coincidence means 33 indicates the coincidence between lines 10 and 22. Thus, at any particular setting of tape 16, the encoded output of diode matrix 7 is compared with the magnetically recorded information and a signal indicates whether or not coincidence with the previously recorded values occurs. Similarly, the output of diode matrix 12, on lines 13, 14 and 15, may be compared with the output of magnetic heads 34, 35 and 36, on lines 37, 38 and 39. The output of line 13 is compared with the output on line 37 by coincidence means 40. The output of line 14 is compared with the output on line 38 by coincidence means 41, and the output on line 15 is compared with the output on line 39 by coincidence means 42. The output line 43 receives the output signal similar to that in line 31 from the coincidence means and acts to drive inverting binary amplifier 44. Line 31 drives inverting binary amplifier 45. Relay 46 controlling three switches, one of which is normally closed, is driven by inverting binary amplifier 44. Relay 47 also having three switches, one of which is normally closed, is controlled by inverting binary amplifier 45.

Amplifiers 44 and 45 and lines 31 and 43 are normally held biased at a low potential by being connected to a voltage negative with respect to ground through resistors 49 and 50. The outputs of amplifiers 44 and 45 are, then, generally high, being inverting amplifiers. Relays 46 and 47 operate to provide signals indicating which of slider devices 1 or 2 is set correctly and which is set incorrectly. A relay 51 operated by amplifier 52 from magnetic head 53 may be used as a master positioning control to allow tape 16 to be placed in position before any signal is received. When tape 16 is in position to be read, magnetic reproducing head 53 provides a signal and causes the switch of relay 51 to close. If the sliders of measuring devices 1 and 2 are in correct positions according to the recorded signals, an output signal will be received at terminal 54. If the slider of device 2 is in an incorrect position, and the slider of device 1 is in a correct position, an output will be received at terminal 55. If the slider of device 1 is in an incorrect position, and the slider of device 2 is in a correct position, an output will be received at terminal 56. If, of course, neither device is in a correct position, according to tape 16, no output signal will be received. Terminal 57 may be used to determine if tape 16 is in a correct position according to the operation of relay 51.

It is clear that a great number of possible settings or conditions may be encoded by the proper use of a suitable diode matrix. The particular encoding scheme shown may also be replaced by other types of matrices and other systems providing digital encoding.

In order to make a record by recording the signals of correct settings on tape 16 which are to be read back at some future time, the switch 58 is thrown from ground to positive D.-C. to cause diodes, such as 59 and 60, to be non-conducting. If diode 59 is non-conducting, the signal received on line 8 is amplified by drive amplifier 61 and passed to head 17 to be recorded on tape 16. Thus, in the process of recording the correct values, the correct values of the conditions represented by devices 1 and 2 are set up, switch 58 is thrown closed to the positive D.-C. terminal, and the signals are recorded on tape 16. Moving to a new position on tape 16, the devices of 1 and 2 are reset according to a second desired set of values of the conditions and the switch 58 is closed again and the signals are again recorded on tape 16, according to the new set up. The signals thus recorded are played back at some later time and the correctness of the settings of devices 1 and 2 is quickly corroborated by the device. Thus, various values of a quality, condition, or group of conditions once constructed can be quickly reconstructed and checked.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, means for producing time parallel encoded electrical signals according to stored information, a plurality of time parallel matrix encoders of electrical signals each said signal representing the value of a given condition, a plurality of sets of electrical coincidence means each said set being connected to receive the corresponding output of said means for producing parallel time coded electrical signals and the output of a corresponding one of said encoders, and providing output signals indicating the existence and non-existence of coincidence of the output signals of the corresponding one of said encoders and said means for producing time parallel encoded electrical signals, and means for producing an output signal indicative of individually distinct combinations of the outputs of said sets of coincidence means.

2. In combination, means for producing electrical signals according to stored information, a plurality of matrix encoders of electrical signals representing the values of given conditions, a plurality of sets of electrical coincidence means each connected to receive the output of said means for producing electrical signals and one of said encoders and provide a signal indicating the existence and non-existence of coincidence of the output signals of its respectively connected encoder with the output signals of said means for producing electrical signals, and means for providing an output signal indicative of individually distinct combinations of the outputs of said sets of coincidence means.

3. The combination recited in claim 2 wherein said means for producing electrical signals according to stored information produces said signals in time parallel, and said matrix encoders of electrical signals encode in time parallel, and each said coincidence means indicates the existence and non-existence of coincidence of the time parallel signals of its respectively connected encoder with said means for producing electrical signals according to stored information.

4. In combination, means for producing signals in time parallel channels according to stored information, at least two time parallel matrix encoders, each comprising a plurality of time parallel channels, separate sets of electrical coincidence means each said set connected to receive the output of corresponding channels of a respective one of said encoders and said means for producing electrical signals, each set of said electrical coincidence means providing a signal indicating the existence and non-existence of coincidence of the signals of corresponding time parallel channels of a respective one of said encoders and said means for producing electrical signals, and means for providing a signal indicative of the outputs of said sets of coincidence means.

5. In combination, a plurality of movable elements, each comprising successive electrical positions, a plurality of diode matrices, the successive positions of each movable element being connected to the inputs of respective diode matrices, a magnetic storage device comprising a plurality of magnetic heads each adapted to be connected to a respective output of said diode matrices, a plurality of sets of electrical coincidence means, each set connected to respective magnetic heads and a respective diode matrix, and means for providing an output signal indicative of the outputs of said sets of coincidence means.

6. In combination, a plurality of movable elements, each comprising successive electrical positions, a plurality of diode matrices, the successive positions of each movable element being connected to the input terminals of a respective diode matrix, a magnetic storage device comprising a plurality of sets of magnetic heads, a plurality of sets of coincidence means, each for providing a signal indicative of the existence and non-existence of coincidence of the outputs of a respective diode matrix and set of magnetic heads, each said set of coincidence means being connected to receive the outputs of a respective set of magnetic heads and a respective diode matrix, and means for providing an output signal indicative of individually distinct combinations of the outputs of said sets of coincidence means.

7. The device as recited in claim 6 wherein said means for providing a signal indicative of the outputs of said sets of coincidence means comprises a plurality of output terminals and switch means interconnecting said output terminals and said sets of coincidence means outputs for providing at individual ones of said output terminals respectively signals uniquely indicative of individually distinct combinations of the outputs of said sets of coincidence means.

References Cited in the file of this patent

UNITED STATES PATENTS

| | | |
|---|---|---|
| 2,588,049 | Rowley | Mar. 4, 1952 |
| 2,648,829 | Ayres | Aug. 11, 1953 |
| 2,731,621 | Sontheimer | Jan. 17, 1956 |
| 2,749,440 | Cartwright | June 5, 1956 |
| 2,785,388 | McWhirter et al. | Mar. 12, 1957 |
| 2,811,707 | Henning et al. | Oct. 29, 1957 |

FOREIGN PATENTS

| | | |
|---|---|---|
| 730,854 | Great Britain | June 1, 1955 |

OTHER REFERENCES

Proceedings of the IRE; Feb. 1949, Rectifier Networks for Multiposition Switching.